UNITED STATES PATENT OFFICE.

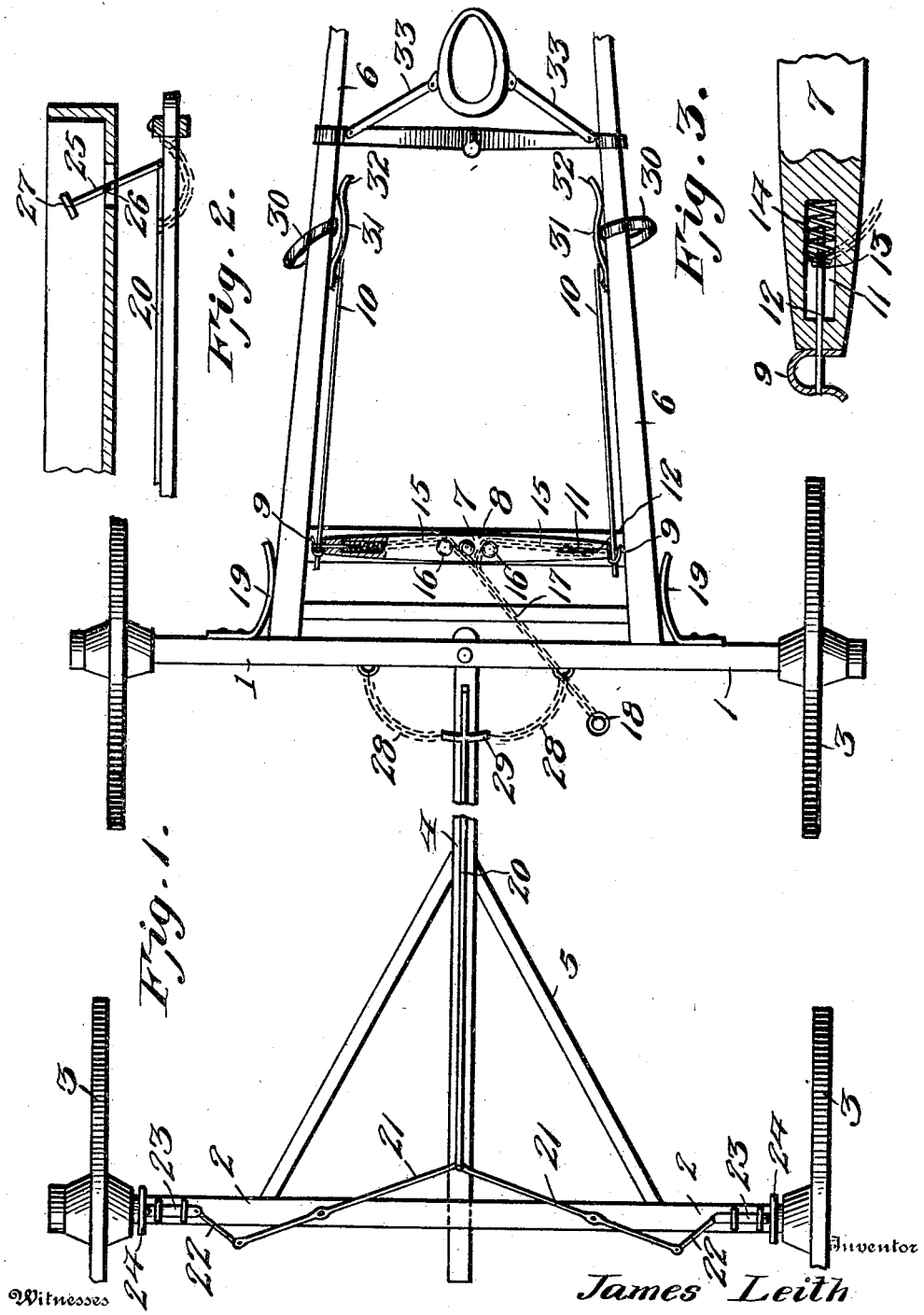

JAMES LEITH, OF SHERBROOK, CANADA, ASSIGNOR OF ONE-HALF TO NAPOLEON LABRECQUE, OF SHERBROOK, CANADA.

VEHICLE ATTACHMENT.

No. 820,217.   Specification of Letters Patent.   Patented May 8, 1906.

Application filed June 9, 1905. Serial No. 264,516.

*To all whom it may concern:*

Be it known that I, JAMES LEITH, a subject of the King of Great Britain, residing at Sherbrook, in the Province of Quebec and Dominion of Canada, have invented new and useful Improvements in Vehicle Attachments, of which the following is a specification.

The invention relates to an improvement in vehicles, and particularly to attaching and detaching devices whereby the traces may be readily engaged and disengaged from the vehicle when desired.

The main object of the invention is the production of means to permit the ready attachment of the traces to the whiffletree of the vehicle, the means being arranged to permit instantaneous detachment of said traces in the event the same should be desirable to prevent accident.

Another object of the invention is to provide means for braking the vehicle whereby its movement may be arrested simultaneously with or immediately succeeding the operation of the detaching device.

The invention in its preferred form is illustrated in the accompanying drawings, wherein—

Figure 1 is a broken plan view of a vehicle with the body removed, illustrating the application of my improvements; and Fig. 2 is a longitudinal sectional view broken off and illustrating the same for operating the braking devices.

Referring to the drawings, my improved vehicle comprises a front axle 1, a rear axle 2, wheels 3, reach-bars 4, hounds 5, and shafts 6, all of which parts may be of any usual or preferred construction, as the details thereof are not material to the present invention.

7 represents a whiffletree pivoted, as usual, at 8 and carrying at the terminals thereof hooks 9 to receive the traces 10. The whiffletree near each end is formed with a housing 11, in which is slidably mounted a pin 12, formed with a concentric disk or shoulder 13, between which and the inner end of the housing is arranged a coiled spring 14, designed to encircle the pin and normally maintain the same in projected position. The outer terminals of the pin are designed to seat within openings formed in the surface of the hooked terminal 9, whereby to form a bar transverse of said hook, that portion of the bar within the hook being designed to engage the trace-eye to secure the trace with relation to the whiffletree. The inner terminals of the pins 12 are each connected to a flexible connection, as a chain 15, which engage pulleys 16, mounted adjacent the pivotal connection of the whiffletree, and project toward the wagon-body, being terminally connected to a single operating-chain 17, which projects into the wagon-body within reach of the driver and is terminally provided with a ring or other handhold 18 for convenient operation.

Spring-arms 19 are secured to the forward axle 1 and arranged to engage the shaft 6 on opposite sides thereof, being adapted to prevent dropping of the shafts to the ground upon release of the animal therefrom.

To provide for braking the vehicle when desired, I provide a braking-bar 20, slidably mounted on the reach-bar 4 and terminally connected at its rear end to levers 21, projecting toward the respective rear wheels 3. The levers are pivoted intermediate their length and at their outer ends are connected by links 22 to bars 23, slidably mounted on the rear axle 2 and bearing at their outer ends upon braking-disks 24, arranged convenient the hubs of the rear wheels. From this construction it is obvious that a rearward movement of the brake-bar 20 will force the disks 24 into contact with the hubs of the rear wheels, and thereby brake said wheels. A foot-lever 25, pivotally secured at 26 in the wagon-body, is provided at its upper end with a foot-piece 27 and pivotally connected at its lower end to the braking-bar 20, whereby forward pressure on the upper end of the foot-lever 25 will force the braking-bar 20 rearward with the effect to brake the rear wheels of the wagon.

It is evident that after detaching the animal from the wagon some means must be provided to prevent accidental or sudden turning of the front axle, and I attain this result through the medium of flexible connections, as chains 28, which are connected at their forward ends to the axle 1 on opposite sides of the reach-bar and at their rear ends to a cross-bar 29, connected to the brake-bar 20. The relative position of the parts is such that when the brake-bar 20 is in its forward or inoperative position the flexible connections 28 are sufficiently loose to permit turning of the forward axle to the degree sufficient to accommodate all movement of the vehicle; but when said brake-bar has been operated to brake the rear wheels the flexible connections 28 are tightened, as will be obvious, with the effect to hold said forward axle 1 against independent turning.

When it is desired to release the animal from the wagon, as to prevent accident or the like, a pull upon the flexible connection 17 will withdraw the pins 12 into the housing, thereby releasing the traces 10 and permitting the forward movement of the animal independent of the wagon. At the same time the driver by the operation hereinabove described applies the brakes, with the effect to stop the vehicle, at the same time insuring its forward movement in a straight line.

The holdback-straps 30 of the harness are seated beneath leaf-springs 31, having flared ends 32 projected toward the free ends of the shafts, the springs contacting with the shafts when in normal position intermediate their ends. This construction provides for the ready separation of the holdback-straps from the shafts in the forward movement of the animal after being released from the swingletree. It is also desirable that means be provided for withdrawing the strap-loops or stirrups depending from the saddle in the forward movement of the animal, and to insure their movement I connect each stirrup with the collar or breast-strap through the medium of the flexible connection 33, which operates, as will be obvious, in the forward movement of the animal to draw the stirrups lengthwise the shafts and off the free end thereof.

From the above description it will be understood that I have produced a very simple effective construction in the operation of which a horse may be instantly released from the vehicle, the speed of the vehicle checked by the operation of the brakes, the shafts prevented from dropping upon the ground, and the forward axle prevented from turning in the slightest degree from the normal direction.

Having thus described the invention, what is claimed as new is—

1. The combination with a vehicle, of a brake for the rear wheels, and flexible connections intermediate the brake mechanism and the front axle of the vehicle to prevent turning of the axle when the braking mechanism has been operated.

2. The combination with a vehicle, of a braking means mounted on the rear axle and adapted to coöperate with the rear wheels, a brake-rod for operating said braking means, and flexible connections extending from the front axle to said braking-rod, whereby said connections are tightened in the operation of the rod.

3. The combination with a vehicle, of braking-disks adapted for coöperation with the rear wheels, levers connected to said disks and projecting toward the longitudinal center of the vehicle, a braking-rod slidably supported on the reach-bar of the vehicle, and chains connected with said brake-rod and with the front axle.

In testimony whereof I affix my signature in presence of two witnesses.

JAMES LEITH.

Witnesses:
  PAUL LANG,
  ALEXINA JONCAS.